Patented Sept. 12, 1950

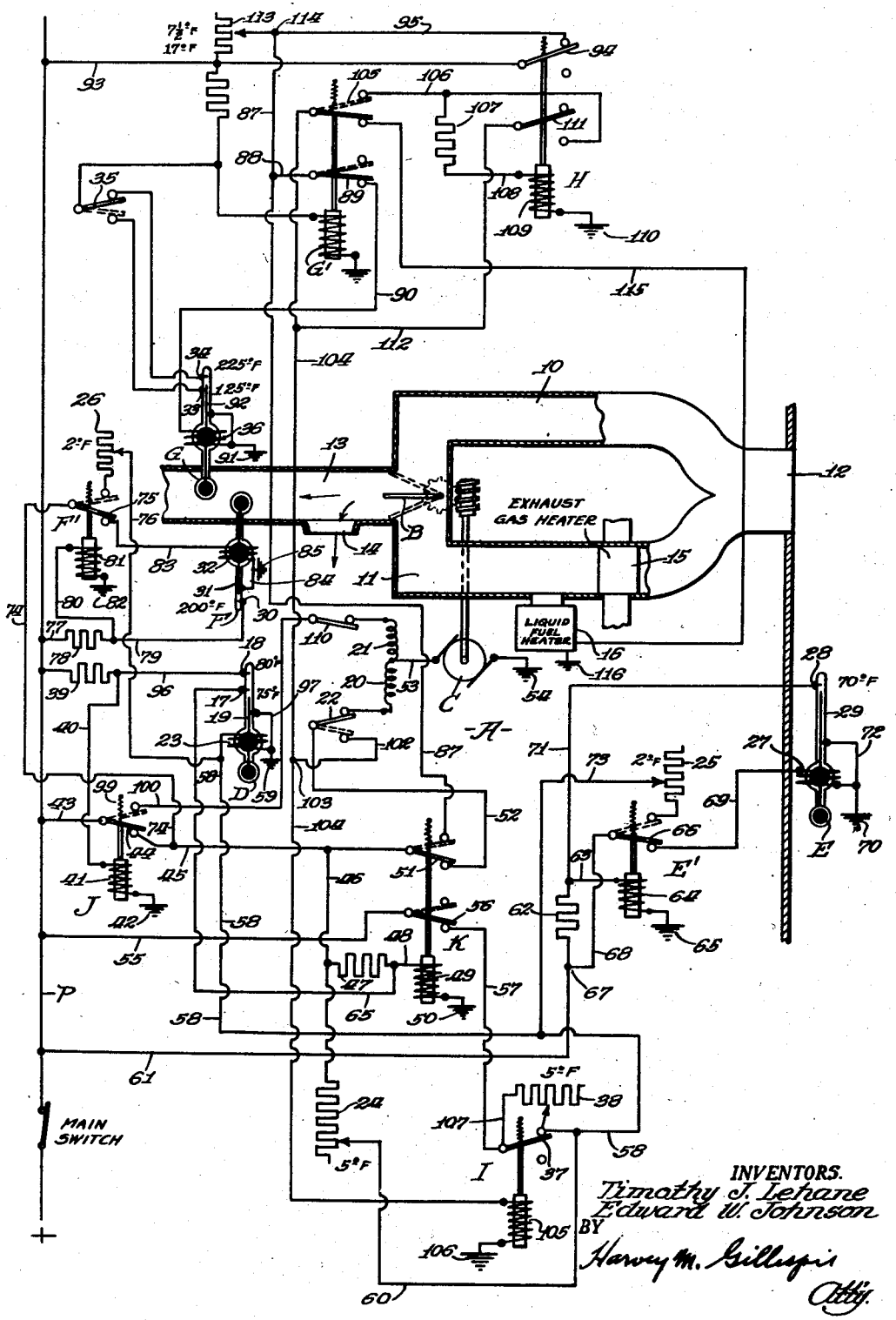

2,522,287

UNITED STATES PATENT OFFICE 2,522,287

CABIN HEATING CONTROL

Timothy J. Lehane, North Riverside, and Edward W. Johnson, Chicago, Ill., assignors to Vapor Heating Corporation, Chicago, Ill., a corporation of Delaware Application July 16, 1949, Serial No. 105,232

16 Claims. (Cl. 237—2)

This invention relates to improvements in electrical systems for controlling the operation of heating apparatus for delivering heat into an enclosed space.

A principal object of the invention is to provide a highly sensitive control system which will act substantially instantaneously to adjust the volume of heat utilized to heat the enclosed space to compensate for any appreciable variation in the heat output of the apparatus before such variation in output is reflected in the temperature within the enclosed space.

While there is no essential limitation as to the field of application, the invention, because of its high sensitivity to slight changes in heat delivery, is particularly suitable for controlling the operations of heating apparatus which obtains its heat from a variable source. The invention is therefore shown herein in connection with an aircraft heating apparatus, since this field of application presents practical conditions for illustrating the sensitivity of the control system to abrupt and somewhat extreme temperature changes. In such case, the engine which provides the power for propelling the airplane, also provides the source of heat for the heating apparatus. The hot exhaust gases from the engine are directed through a heat exchanger for heating air delivered into the cabin of the aircraft. Consequently, any acceleration or deceleration of the engine, from time to time, varies the heating effect of said heat exchanger. It will be apparent, therefore, that in some instances the acceleration of the engine will produce more heat than is required to heat the cabin. In other instances, the heat output from the heat exchanger may be inadequate. In the latter case, the invention includes the provision of a liquid fuel heater which may function conjointly with the exhaust gas heat exchanger when the heat output from the latter is inadequate, or it may function alone during periods when the engine is not operating.

According to the invention, the space to be heated can be regarded as applicable to any enclosed space heated by means of heated air introduced therein. The air, in the present embodiment, is taken from the outside and passed through two branch ducts which connect with a main delivery duct communicating with the enclosed space. The air in one branch duct is heated and mixed, in the required proportions, with the unheated air from the other branch duct, to provide the main duct with delivery air of the desired temperature.

The blending of the heated and unheated air is controlled by an air proportioning valve positioned at the junction of the two branch ducts with the main duct. The valve is adjusted from one position to another, in a step by step fashion, by means of a reversible motor. The forward and reverse energizing circuits for the motor are controlled by the operations of relays which are themselves controlled by a plurality of cooperatively related thermostats, including a thermostat responsive to the outside temperature, a pair of thermostats responsive to the temperature of the air delivered into the enclosed space, and a thermostat responsive to the temperature of the atmosphere within the said enclosed space.

The source of heat utilized to heat the air is determined largely by the field of application. For aircraft and in other situations where internal combustion or turbo-jet engines are used, the exhaust gases from the engines may be directed through a heat exchanger to apply heat to the air delivered into the enclosure. In other situations, the heat exchanger may be energized by any available source of suitable heat.

The thermostats are constructed to sense any appreciable change in the heat output of the heat exchanger and function to effect the necessary adjustment of the air proportioning valve to compensate for variations in the heat output from the heat exchanger before these variations are reflected in the temperature of the enclosed space being heated and before it is reflected, to an objectionable extent, in the temperature of the air being delivered into said enclosed space. The highly sensitive responses of the several thermostats are obtained by virtue of the fact that large amounts of auxiliary heat are applied intermittently to the several thermostats so that they are caused to cycle at all times during the operation of the heating system. In this way the thermostats are maintained at or near their functional settings at all times and, consequently, are immediately available to adjust the air proportioning valve in a direction to offset any abrupt change in the heat output of the heat exchanger. Consequently, the sensitivity of the controls avoids momentary delivery of air at high temperature into the enclosed space during an abrupt increase in heat delivered to the heat exchanger, during acceleration of the engine supplying the heating medium, or during the operation of said liquid fuel heater.

It is, therefore, a specific object of the invention to provide a highly sensitive control system, such as hereinabove briefly described, for controlling the delivery of heat into an enclosed space.

The invention is illustrated as schematically in the accompanying drawing.

Heating apparatus

In the drawing, a heating apparatus is illustrated as comprising a pair of branch ducts 10 and 11 for receiving air under pressure from the outside of an enclosure A through an entrance port 12. The said air may be forced into the branch ducts by means of an ordinary blower (not shown), or, as in the case of aircraft and other moving vehicles, by movement of the entrance port 12 through the atmosphere. Both branches 10 and 11 connect at a common point with a main delivery duct 13, the latter of which receives air from the said branches and delivers it into the enclosure A through one or more discharge ports 14. The air in the branch duct 11 is passed through a heat exchanger 15. The said heat exchanger may receive its heat from any available source. However, the present disclosure contemplates the use of hot combustion gases discharged from an internal combustion engine (not shown). When the heat delivered to the exchanger 15 is insufficient to supply the heating demand or when said heat exchanger is temporarily ineffective, the liquid fuel heater 16 is utilized to deliver heat into the branch duct 11.

In order to maintain the air in the air delivery duct 13 at a desired temperature, a proportioning valve B is positioned at the juncture of the branches 10 and 11 so as to proportionately vary the amounts of heated and unheated air delivered into the main duct 13. The said valve B is automatically adjusted to various positions by means of a reversible motor C, the energizing circuits of which are controlled by a thermostat D responsive to the temperature of the enclosed space A and automatically adjusted by the cooperative influences of three thermostats designated E, F and G. The side temperatures and both thermostats F and G respond to the temperature of the delivery in the air delivery duct 13. For this reason, both thermostats F and G are shown extending into the air delivery duct 13.

Space control thermostat D

The thermostat D is provided with lower and upper contacts 17 and 18 which define the lower and upper limits, respectively, of a predetermined temperature range, for example 5° F., the lower contact representing a space temperature of 75, and the upper contact 18 representing a space temperature of 80° F. When the mercury column 19 stands below the lower contact 17 the thermostat is calling for heat and an energizing circuit is established through the field winding 20 of the motor C to operate the proportioning valve B in a direction to increase the volume of heated air delivered from branch duct 11 into duct 13 and correspondingly reduce the delivery of unheated air from branch duct 10 into the duct 13. When the atmosphere within the space A reaches the desired control temperature, for example when the mercury column 19 of thermostat D engages the lower contact 17 or stands within the space defined by contacts 17 and 18, the motor is rendered inactive. Consequently, the valve B remains in its last adjusted position. However, when the temperature of the enclosed space is such as to cause the mercury column 19 of thermostat D to engage the upper contact 18, a motor energizing circuit is closed through the field winding 21 to operate the motor C in a direction to adjust the valve B to a position to reduce the volume of heated air delivered into the duct 13 and increase the volume of unheated air delivered thereto.

While the thermostat D is operative to control the operation of the motor C and consequently control the adjustment of the air proportioning valve B, the functioning of the said thermostat D is influenced from time to time by the thermostats E, F and G, by controlling the application and removal of auxiliary heat to said thermostat. A like influence is also exercised by a limit switch 22 of the motor C when it reaches the limit of its movement under a continuous call for heat.

Each thermostat is provided with an electrical heater which, under the conditions hereinafter described, receives a large amount of electrical current. The volume of current in each case is referred to as "X" volume and is sufficient, when applied, to cause the thermostat to function substantially instantaneously under any operating condition encountered.

Auxiliary heater 23 for space thermostat D

The auxiliary heater for thermostat D is designated 23 and is made subject to said X volume of electrical current only when the thermostat is calling for heat, that is to say, when the mercury column 19 stands below the lower contact 17. When this thermostat is satisfied and until the mercury column engages upper contact 18, it receives smaller volumes of current equivalent to 5° F. through variable resistor 24, as per its present adjustment, to establish the functional setting of the upper contact at 80° F. It also receives momentary circuits through variable resistors 25 and 26, each being equivalent, at the shown adjustment, to 2° F., thereby providing a cycling heating circuit for heater 23 equivalent to 4° F.; the timing of the cycling action being under the control thermostats E and F and their associated relays E' and F' respectively. The said heater circuits through resistors 25 and 26 are momentarily effective during the heating cycle when the thermostat calls for heat, but their effect is negligible as compared to the effect of the current of "X" volume which is then effective.

Outside thermostat E, its associated relay E' and auxiliary heater 27

The outside thermostat E is of the single contact type and is set to function at 70° F. An electrical auxiliary heater 27 which is momentarily energized by an electrical current of "X" volume by the energization of its associated relay E'; the said relay being cycled off the contact 28 each time the mercury column 29 engages said contact 28. It will be observed in this connection that during the application of the "X" volume current to the heater 27 of the outside thermostat E, the 2° cycling circuit through resistor 25 is broken.

Air delivery thermostat F, its relay F' and auxiliary heater 32

The thermostat F has a single contact 30 and is set to function at a temperature of 200° F. This thermostat controls the relay F'.

When the mercury column 31 recedes from the contact 30, the relay F' is energized to close to deliver "X" volume current to heater 32 of thermostat F. When the relay F' is deenergized a circuit having a heat control value of 2° F. is on thermostat D and is closed through resistor 26. This is a cycling circuit while the air temperature is below 200° F., but it becomes a constant set-down circuit for thermostat D while the air in delivery duct is maintained at a temperature of 200° F.

*Duct thermostat G, its associated relay G' and auxiliary heater 36*

The thermostat G is provided with a lower contact 33 set to function at a temperature of 125° F., and an upper contact 34 set to function at a duct temperature of 225° F. A manually operable switch 35 determines which of the two contacts 33 or 34 shall be effective. Either of said contacts, when effective, controls the energization of relay G' and consequently controls the application of an electrical heating current of "X" volume to heater 36.

*Holding circuit relay H*

The deenergization of the relay G' is effective, if the motor C has moved to its extreme heat delivery position, at which time the limit switch 22 thereof assumes the dotted line position, to energize the liquid fuel heater 16 and simultaneously therewith energize relay H for closing a holding circuit through the liquid fuel burner.

*Relay I*

During the above condition, the dotted line position of said motor limit switch 22 also energizes relay I and thereby opens its contact 37 to remove the "X" volume current from space thermostat D, but establishes a further 5° circuit through variable resistor 38. It will be observed, in this connection, that the functioning of the liquid fuel heater is controlled by the temperature of the air in the duct 13 and that in the event that the air duct temperature rises to 225° F., the liquid fuel heater will be deenergized without regard to the temperature of the enclosed space and thereby avoid any possibility of delivering air thereto at a temperature higher than 225° F.

*Electric circuits complete*

The electrical circuits are illustrated under an assumed condition in which the air proportioning valve B is in an intermediate position so as to supply proportioned quantities of heated and unheated air to the delivery duct 13. It is also assumed that the duct thermostat F will close at a temperature of 200°, the open outside thermostat E will close at a temperature of 70° and the space thermostat D is calling for heat.

Under such assumed conditions the relays J and K, associated with the space thermostat D, are energized to close a circuit through motor C in a direction to adjust valve B to increase the proportion of heated air delivered to the delivery duct 13 and to correspondingly reduce the proportion of unheated air delivered. These circuits are as follows: The circuit for energizing relay J leads from positive line P through resistor 39, wire 40 and coil 41 to ground 42. The relay J being thus energized closes a circuit leading from positive line P through wire 43, contact 44 of relay J, wires 45, 46, resistance 47, wire 48, coil 49 to ground 50, thereby energizing said relay K. The energization of relays J and K closes a momentary energizing circuit through the motor C in a direction to adjust the valve B to increase the volume of heated air delivered from branch duct 11 and decrease the volume of unheated air delivered for the branch duct 10. This motor energizing circuit leads from positive line P, through wire 43, contact 44 of relay J, wire 45, contact 51 of relay K, wire 52, motor limit switch 22, motor field 20 and motor armature C to ground 54. This motor circuit, as before indicated, is closed only momentary, since the auxiliary heater 23 of thermostat D is simultaneously energized through several circuits, whereby the heating effect on the thermostat D is sufficient to cause its mercury column 19 to engage the lower contact 17.

One of said heating circuits leads from line P through connector 55, closed contact 56 of relay J, wire 57, normally closed contact 37 of deenergized relay I, and thence by wire 58 through heater 23 to the ground 59. This circuit delivers an "X" volume of current to the heater 23 sufficient to cause the thermostat D to close at its lower contact 17. The other circuits for supplying lesser volumes of current to the auxiliary heater 23 are as follows: A circuit equivalent to 5° F. leads from wire 46 through variable resistor 24 and thence through wires 60 and 58 through the heater 23.

The closing of the thermostat D at its lower contact diverts the current from solenoid 49 of relay K, and thereby deenergizes the relay and opens said motor energizing circuit and the said "X" volume heater circuit to heater 23. The diverting circuit leads from wire 48 through wire 65, through thermostat contact 17 and mercury column 19 to ground 59. The said 5° heating circuit through variable resistor 24 is utilized to establish the desired functional setting of thermostat D. Consequently, the circuit remains closed until the thermostat D calls for a reduction of heat delivered into space A, at which time the mercury column 19 of the thermostat engages the upper contact and thereby deenergizes relay K and motor C.

Simultaneously with the energization of the relays J and K, the relay E' is energized to direct a heating circuit of "X" volume through the auxiliary heater 27 of the outside thermostat E, the said "X" volume being sufficient to cause momentary closing of its contact 28. The energizing circuit for the said relay E' leads from the positive line P through wire 61, resistor 62 and wire 63 through solenoid 64 to the ground 65. The energization of the solenoid 64 moves the relay contact 66 to the closed position shown and thereby establishes an energizing circuit for the said auxiliary heater 27. This circuit leads from the junction 67 in wire 61, through wire 68, energized closed contact 66 of relay E', wire 69, through auxiliary heater 27 to the ground 70. The heating circuit thus established applies sufficient heat to the auxiliary heater 27 to cause the mercury column 29 of thermostat E to engage its contact 28, thereby deenergizing relay E' by diverting the energizing circuit from its solenoid 64. This diverting circuit leads from the resistor 62 through wire 71, thermostat contact 28, mercury column 29 and wire 72 to the ground 70. It will be seen, therefore, that the outside thermostat E is cycled throughout the operation of the control system when the outside temperature is below 70° F., the functional setting of the thermostat.

Each time the relay E is deenergized, the contact 66 closes a circuit through the variable resistor 25 so as to direct a cycling circuit equivalent to 2° F., to the auxiliary heater 23 of the thermostat D. This heating circuit leads from the said juncture 67, wire 68, deenergized relay contact 66, variable resistor 25 and wire 73 to wire 66 through which it is directed to the heater 23 and ground 59.

Another cycling circuit equivalent to 2° is directed to the heater 23 of heated thermostat D through variable resistor 26 when the relay F'' is deenergized. This circuit leads from wire 45 through wire 74, deenergized contact 75 of relay F'', variable resistor 26 and wire 76 to wire 58, and thence through the heater 23 to the ground 59. This cycling circuit is controlled by the said relay F'' which, in turn, is controlled by the delivery air thermostat F located in the duct 13. The auxiliary heater for said thermostat F is energized through a circuit closed by the energization of the relay F'', the latter of which is energized when the mercury column 31 of thermostat F recedes below its contact 30. The energizing circuit for relay F'' leads from positive line P through wire 77, resistor 78 and wires 79 and 80 through the solenoid coil 81 of relay F'' to the ground 82. The heater circuit closed by the energization of relay F'' includes the closed position of contact 75 of relay F'', wires 83, coil 32 and wire 84 to the ground 85. The heating circuit thus established causes the mercury column 31 to engage the thermostat contact 30 with a cycling action so as to momentarily energize and deenergize the relay F'' and consequently apply and remove 2° of heat to the said heater 23 of thermostat D until the heated air in duct 13 assumes the temperature of 200° Fahrenheit, at which time the 2° circuit through variable resistor 26 will be effective to apply a constant heating circuit to the heater 23 of thermostat D.

The last mentioned condition will continue until the temperature of the enclosed space A reaches the functional setting of the lower contact 17 of thermostat D or until the repeated cycling action of thermostat D and consequent intermittent adjustments of motor C moves the valve B to its fully open heating position. However, as soon as the mercury column 19 of the space thermostat engages its contact 17, either momentary or otherwise, the relay K is deenergized and its contact 51 moves to the shown dotted line position to close a heating circuit of "X" volume through the heater 36 of duct thermostat G. This heating circuit leads from the up position of contact 56 of relay K through wires 87, 88, closed contact 89 of relay G' and wire 90 to the heater 36 and ground 91 of thermostat G. This said circuit of "X" volume is applied to heater 36 in addition to its regular heater circuit of "X" volume, so as to make doubly certain that the mercury column 92 of duct thermostat G will be maintained in close relation to its control contact 33, or 34, as the case may be. The other heating circuit of "X" volume for duct thermostat G leads from line P through wire 93, contact 94 of relay H, wires 95, 87, 88, closed contact 89 of relay G', wire 90 to heater 36 and ground 91.

Assuming for the present that the air proportioning valve B is at an intermediate position when the temperature of the enclosed space A reaches the functional setting of the lower contact 17 of thermostat D: The mercury column 19 of said thermostat D remains in circuit closing position with the lower contact 17, thereby deenergizes the relay K so that the motor C will remain stationary. If the temperature in the enclosure A continues to rise until the mercury column 19 engages the upper contact 18 of thermostat D, the energizing circuit for thermostat J is diverted from the solenoid 41 through wire 96, contact 18 and mercury column 19 of thermostat D to wire 97 and the ground contact 59. The contact 98 of relay J is therefore moved by the spring 99 into a position to close a circuit through the motor C in the direction to move the valve in a direction to reduce the proportion of heated air delivered into the delivery duct 13 to increase the proportion of unheated air delivered thereto. This motor energizing circuit leads from line P through wire 43, deenergized contact 98 of relay J, wire 100, limit switch 101 and motor field winding 21, thence through wire 53 and motor armature C to the ground connection 54. As soon as the mercury column 19 recedes from the upper contact 18 the motor is deenergized and will remain deenergized until the column again recedes below the contact 17. However, the thermostat D will cycle off its contact 18 since each time that the mercury column 19 recedes from the said contact, the auxiliary heat supplied through the variable resistor 24 is removed by the deenergization of the relay J. There is also the cycling circuit of 2° through resistor 25 and said heater 23; this circuit being closed through the relay E' under the control of the outside thermostat E.

*Liquid fuel heater 16*

Assuming now that the primary heater 15, when operating at full capacity, fails to deliver sufficient heat to cause the mercury column of thermostat D to engage the lower contact 17: The continuous call for heat will result in moving the valve B to the limit of its heat delivering position. When this occurs the motor limit switch 22 will automatically assume a position to close a circuit leading from wire 52 to wire 102 which is joined at 103 to a wire 104, the latter of which leads through the solenoid 105 of relay I to the ground 106, thereby energizing the relay I to open its contact 37. The opening of this contact automatically removes the "X" volume of current from the heater 23 of thermostat D, but a heating circuit continues from wire 57 through wire 107, variable resistor 38 and wire 58 to the heater 23. The heating circuit just described may be of any suitable value, for example 5° F.

The changed position of said motor limit switch 22 also directs electric current through the upper portion of wire 104 to the upper contact 105 of relay G', which relay is constantly cycled by opening and closing of the "X" volume heating circuit which was previously described as leading from the line P through wire 93, contact 94 of relay H, wires 95, 87 and 88 through the energized lower contact 89 of relay G' and wire 90 through said heater 35 to the ground 91. This "X" volume heating circuit is open at the contact 94 of relay H upon the first deenergized cycle of relay G' after the liquid fuel heater 16 is energized. The relay H is initially energized during the deenergized portion of the first cycle movement of relay G' after limit switch 22 assumes its dotted line position; the electric current passing from the upper portion of wire 104 through contact 105 of said relay G' to wire 106, resistor 107 and wire 108 through solenoid 109 of relay H to the ground contact 110. The energization of relay H closes contact 111 so as to establish a holding circuit for the relay. This holding circuit leads from wire 104 through wire 112, closed contact 111 of relay H, wire 106, resistor 107, wire 108 through solenoid 109 to the ground 110. While the "X" volume heating circuit for the heater 36 of relay G' is broken by the energization of relay H, a heating circuit equivalent to 17° of heat is supplied to the heater 36. This circuit leads from line P through wire 83, variable resistor 113 to junction 114 and thence through wires 87, 88, closed contact 89 of relay G' and wire 90 to heater 36 and ground 91.

The liquid fuel heater 16 is energized by the energized cycle closing of contact 105; the energizing current for the heater being directed from the energized closed contact 105 through wire 115 to ground 116. This circuit, it will be observed, is effective only while the motor limit switch 22 remains in its dotted line position. The heavy cycle during this period is removed from the duct thermostat but the operations of the heater 16 will be cycled by the cycling movement of relay G' under the influence of the auxiliary heating circuit supplied to thermostat G through the resistor 113. The cycling of the liquid fuel burner will also be influenced by the cycling of the space thermostat D and the consequent intermittent application of heating current of "X" volume to thermostat G by the cycling of relay K, the said current being directed, as before indicated, through the deenergized position of contact 51 of relay K to wire 87.

As soon as the space thermostat D calls for a reduction of heat, the first movement of the motor C in a direction to move the valve B in a direction to reduce the delivery of heat, breaks the energizing circuit through the liquid fuel heater and the holding circuit for relay H is also deenergized. The heating system is thereby returned to the delivery of heat from the primary heater 15 only.

While the invention is disclosed in connection with certain preferred embodiments, it will be understood that various changes in arrangement and construction may be made, within the scope of the appended claims, without departing from the spirit of invention.

We claim:

1. In combination with a space heating apparatus including an air heater and a motor operated valve for proportionately blending quantities of heated and unheated air for delivery into an enclosed space, of means for operating the valve in a direction to increase the delivery of heated air and decrease the delivery of unheated air comprising a motor energizing circuit including a pair of separately energized relays having energized closed contacts connected in series, a motor energizing circuit, including a deenergized closed contact of one of said relays, for moving said valve in a direction to increase the delivery of unheated air and decrease the delivery of heated air, and means for controlling the energization of said relays comprising a thermostat responsive to the temperature of the space and provided with spaced contacts representing the lower and upper limits of a predetermined temperature range, a lower limit control circuit connected through said lower limit contact and effective when this contact is closed to deenergize one of said relays and thereby stop the heat increasing movement of said valve, and an upper limit control circuit connected through said upper limit contact and effective when this contact is closed to deenergize the other relay and thereby close said motor circuit for operating said valve in a direction to increase the delivery of unheated air and decrease the delivery of heated air.

2. In combination with a space heating apparatus including an air heater and a motor operated valve for proportionately blending quantities of heated and unheated air for delivery into an enclosed space, of means for operating the valve in a direction to increase the delivery of heated air and decrease the delivery of unheated air comprising a motor energizing circuit including a pair of separately energized relays having energized closed contacts connected in series, a motor energizing circuit, including a deenergized closed contact of one of said relays, for moving said valve in a direction to increase the delivery of unheated air and decrease the delivery of heated air, and means for controlling the energization of said relays comprising a thermostat responsive to the temperature of the space and provided with spaced contacts representing the lower and upper limits of a predetermined temperature range, a lower limit control circuit connected through said lower limit contact and effective when this contact is closed to deenergize one of said relays and thereby stop the heat increasing movement of said valve, an upper limit control circuit connected through said upper limit contact and effective when this contact is closed to deenergize the other relay and thereby close said motor circuit for operating said valve in a direction to increase the delivery of unheated air and decrease the delivery of heated air, an electrical auxiliary heater for said thermostat and an energizing circuit for said heater connected in said first mentioned motor energizing circuit intermediate said series connected contacts of said relays, whereby this heating circuit is effective when the upper limit control circuit is open.

3. A space heating apparatus and control therefor as defined in claim 2 in which the heater energizing circuit of claim 2 is provided with a variable resistor, whereby the effective temperature setting of said thermostat contacts may be raised and lowered.

4. In combination with a space heating apparatus including an air heater and a motor operated valve for proportionately blending quantities of heated and unheated air for delivery into an enclosed space, of means for operating the valve in a direction to increase the delivery of heated air and decrease the delivery of unheated air comprising a motor energizing circuit including a pair of separately energized relays having energized closed contacts connected in series, a motor energizing circuit, including a deenergized closed contact of one of said relays, for moving said valve in a direction to increase the delivery of unheated air and decrease the delivery of heated air, means for controlling the energization of said relays comprising a thermostat responsive to the temperature of the space and provided with spaced contacts representing the lower and upper limits of a predetermined temperature range, a lower limit control circuit connected through said lower limit contact and effective when the contact is closed to deenergize one of said relays and thereby stop the heat increasing movement of said valve, an upper limit control circuit connected through said upper limit contact and effective when this contact is closed to deenergize the other relay and thereby close said motor circuit for operating said valve in a direction to increase the delivery of unheated air and decrease the delivery of heated air, an electrical auxiliary heater for said thermostat and an energizing circuit for said heater connected in said first mentioned motor energizing circuit intermediate said series connected contacts of said relays, whereby the heating circuit for said electrical auxiliary heater is effective when the upper limit control circuit is open, means comprising a variable resistor interposed in said heating circuit for varying the temperature heating of the lower and upper contacts of said thermostat, a thermostat set to function at a predetermined outside temperature, and a second circuit for said space thermostat heater including a relay controlled by said outside thermostat and effective when said outside thermostat is closed to direct additional heating current to said space thermostat heater.

5. In combination with a space heating apparatus including an air heater and a motor operated valve for proportionately blending quantities of heated and unheated air for delivery into an enclosed space, of means for operating the valve in a direction to increase the delivery of heated air and decrease the delivery of unheated air comprising a motor energizing circuit including a pair of separately energized relays having energized closed contacts connected in series, a motor energizing circuit, including a deenergized closed contact of one of said relays, for moving said valve in a direction to increase the delivery of unheated air and decrease the delivery of heated air, means for controlling the energization of said relays comprising a thermostat responsive to the temperature of the space and provided with spaced contacts representing the lower and upper limits of a predetermined temperature range, a lower limit control circuit connected through said lower limit contact and effective when the contact is closed to deenergize one of said relays and thereby stop the heat increasing movement of said valve, an upper limit control circuit connected through said upper limit contact and effective when this contact is closed to deenergize the other relay and thereby close said motor circuit for operating said valve in a direction to increase the delivery of unheated air and decrease the delivery of heated air, an electrical auxiliary heater for said thermostat and an energizing circuit for said heater connected in said first mentioned motor energizing circuit intermediate said series connected contacts of said relays, whereby the heating circuit for said electrical auxiliary heater is effective when the upper limit control circuit is open, means comprising a variable resistor interposed in said heating circuit for varying the temperature heating of the lower and upper contacts of said thermostat, a thermostat set to function at a predetermined outside temperature, a second circuit for said space thermostat heater including a relay controlled by said outside thermostat and effective when said outside thermostat is closed to direct additional heating current to said space thermostat heater, and a variable resistor interposed in this circuit for varying the volume of heating current delivered to said heater.

6. In combination with a space heating apparatus including an air heater and a motor operated valve for proportionately blending quantities of heated and unheated air for delivery into an enclosed space, of means for operating the valve in a direction to increase the delivery of heated air and decrease the delivery of unheated air comprising a motor energizing circuit including a pair of separately energized relays having energized closed contacts connected in series, a motor energizing circuit, including a deenergized closed contact of one of said relays, for moving said valve in a direction to increase the delivery of unheated air and decrease the delivery of heated air, means for controlling the energization of said relays comprising a thermostat responsive to the temperature of the space and provided with spaced contacts representing the lower and upper limits of a predetermined temperature range, a lower limit control circuit connected through said lower limit contact and effective when the contact is closed to deenergize one of said relays and thereby stop the heat increasing movement of said valve, an upper limit control circuit connected through said upper limit contact and effective when this contact is closed to deenergize the other relay and thereby close said motor circuit for operating said valve in a direction to increase the delivery of unheated air and decrease the delivery of heated air, an electrical auxiliary heater for said thermostat and an energizing circuit for said heater connected in said first mentioned motor energizing circuit intermediate said series connected contacts of said relays, whereby the heating circuit for said electrical auxiliary heater is effective when the upper limit control circuit is open, means comprising a variable resistor interposed in said heating circuit for varying the temperature heating of the lower and upper contacts of said thermostat, a thermostat set to function at a predetermined outside temperature, a second circuit for said space thermostat heater including a relay controlled by said outside thermostat and effective when said outside thermostat is closed to direct additional heating current to said space thermostat heater, a variable resistor interposed in this circuit for varying the volume of heating current delivered to said heater, an auxiliary heater for the outside thermostat, and an energizing circuit connected through the energized closed position of the relay controlled by the outside thermostat for directing a large volume of heating current to said outside thermostat, whereby this thermostat is caused to cycle when the outside temperature stands below the functional setting of the outside thermostat and the second energizing circuit for the space thermostat heater is opened and closed by the cycling operation of the last mentioned electrical switch.

7. A space heating apparatus and control therefor as defined in claim 6 including a thermostat responsive to the temperature of the air blended for delivery into the space, and a third circuit for delivering additional heating current to the space thermostat heater including a relay controlled by the blended air responsive thermostat and adapted when the delivery air thermostat is satisfied to close said third heating circuit, the heating circuit being connected in the motor energizing circuit intermediate said pair of relays, whereby both the first and third energizing circuits for the space thermostat heater are opened when the space thermostat is closed at its upper limit contact to initiate increased delivery of unheated air.

8. In combination with a space heating apparatus including an air heater and a motor operated valve for proportionately blending quantities of heated and unheated air for delivery into an enclosed space, of means for operating the valve in a direction to increase the delivery of heated air and decrease the delivery of unheated air comprising a motor energizing circuit including a pair of separately energized relays having energized closed contacts connected in series, a motor energizing circuit, including a deenergized closed contact of one of said relays, for moving said valve in a direction to increase the delivery of unheated air and decrease the delivery of heated air, means for controlling the energization of said relays comprising a thermostat responsive to the temperature of the space and provided with spaced contacts representing the lower and upper limits of a predetermined temperature range, a lower limit control circuit connected through said lower limit contact and effective when the contact is closed to deenergize one of said relays and thereby stop the heat increasing movement of said valve, an upper limit control circuit connected through said upper limit contact and effective when this contact is closed to deenergize the other relay and thereby close said motor circuit for operating said valve in a direction to increase the delivery of unheated air and decrease the delivery of heated air, an electrical auxiliary heater for said thermostat and an energizing circuit for said heater connected in said first mentioned motor energizing circuit intermediate said series connected contacts of said relays, whereby the heating circuit for said electrical auxiliary heater is effective when the upper limit control circuit is open, means comprising a variable resistor interposed in said heating circuit for varying the temperature heating of the lower and upper contacts of said thermostat, a thermostat set to function at a predetermined outside temperature, a second circuit for said space thermostat heater including a relay controlled by said outside thermostat and effective when said outside thermostat is closed to direct additional heating current to said space thermostat heater, a variable resistor interposed in this circuit for varying the volume of heating current delivered to said heater, an auxiliary heater for the outside thermostat, an energizing circuit connected through the energized closed position of the relay controlled by the outside thermostat for directing a large volume of heating current to said outside thermostat, whereby this thermostat is caused to cycle when the outside temperature stands below the functional setting of the outside thermostat and the second energizing circuit for the space thermostat heater is opened and closed by the cycling operation of the last mentioned electrical switch, a thermostat responsive to the temperature of the air blended for delivery into the space, a third circuit for delivering additional heating current to the space thermostat heater including a relay controlled by the thermostat responsive to the temperature of the delivery air and adapted when the blended air thermostat is satisfied to close said third heating circuit; this heating circuit being connected in the motor energizing circuit intermediate said pair of relays, whereby both the first and third energizing circuits for said space thermostat heater are opened when the space thermostat is closed at its upper limit contact to initiate increased delivery of unheated air, an electrical heater for the delivery air thermostat, and an energizing circuit therefor connected through an energized closed contact of the relay controlled by the thermostat responsive to the temperature of the delivery air and adapted to deliver a large amount of heating current to the last mentioned heater, whereby the delivery air thermostat is caused to cycle when the temperature of this air is below the functional setting of the said delivery air thermostat.

9. A space heating apparatus and control therefor as defined in claim 1 provided with an electrical auxiliary heater for the space thermostat, and a second energized closed contact forming a part of the relay controlled by the low limit control circuit and effective normally to deliver a large volume of heating current to the space thermostat heater to momentarily close the thermostat at said low limit contact, whereby said space thermostat is cycled off said lower limit contact when the space temperature stands below said lower limit of said temperature range.

10. A space heating apparatus and control therefor as defined in claim 1 provided with an electrical auxiliary heater for said thermostat, a second energized closed contact forming a part of the relay controlled by the low limit control circuit and effective normally to deliver a large volume of heating current to the space thermostat heater to momentarily close the same at its low limit contact, a second relay interposed in said heating circuit, a shunt connection including a resistor therein connected in said heating circuit at opposite sides of said second relay for directing a reduced volume of heating current to the space thermostat heater when the latter is calling for heat and the second relay is opened, and a control circuit for the second relay including a motor operated switch effective, when the valve reaches the limit of its heat delivery movement to energize said second relay to open said large volume heating circuit while the space thermostat remains unsatisfied.

11. A space heating apparatus and control therefor as defined in claim 1 provided with an electrical auxiliary heater for said thermostat, a second energized closed contact forming a part of the relay controlled by the low limit control circuit and effective normally to deliver a large volume of heating current to the space thermostat heater to momentarily close the same at its low limit contact, a second relay interposed in said heating circuit, a shunt connection including a resistor therein connected in said heating circuit at opposite sides of said second relay for directing a reduced volume of heating current to the space thermostat heater when the latter is calling for heat and the second relay is opened, a control circuit for the second relay including a motor operated switch effective, when the valve reaches the limit of its heat delivery movement to energize said second relay to open said large volume heating circuit while the space thermostat remains unsatisfied, a second heating circuit connecting in the motor energizing circuit intermediate said pair of relays, for delivering additional heating current to said space thermostat heater, a third heating circuit for said space thermostat heater and including a resistor for limiting the volume of heating current and including also a deenergized closed contact of a third relay, and means for controlling the operation of said third relay comprising a thermostat responsive to the temperature of the delivery air, an auxiliary heater for said air delivery thermostat, and a circuit connected through an energized closed contact of said third relay for delivering a large volume of heating current to the auxiliary heater of the delivery air thermostat so as to cycle the same while the delivery air thermostat remains unsatisfied and the space thermostat remains open at its upper limit contact.

12. In combination with a space heating apparatus provided with a source of heat including an electrical energized air heater, means including a duct for delivering the heated air into an enclosed space, electrically operated valve means for controlling the delivery of said heated air, means including a thermostat and a relay controlled thereby for adjusting the position of said valve to vary the delivery of heated air in response to temperature variations within the enclosed space, an electrically energized auxiliary air heater, a second relay, an energizing circuit therefor, a thermostat responsive to the temperature of the delivery air and set to function at a predetermined temperature to deenergize said second relay, an electrical auxiliary heater for said delivery air thermostat, an energizing circuit for delivering a large volume heating current to the auxiliary heater of said delivery air thermostat and connected through an energized closed contact of said second relay, whereby the second relay is cycled by the opening and closing of the delivery air thermostat, and an energizing circuit for said auxiliary air heater connected through an energized closed contact of the second relay and including also a switch closed by the movement of said valve to its maximum heat delivery position, whereby the auxiliary air heater is intermittently energized and is available only when the said valve stands in its maximum heat delivery position, the temperature of the delivery air is below the functional setting of the delivery air thermostat, and the space thermostat is calling for heat.

13. The combination of a heating apparatus and a control system therefor as defined in claim 12, provided with means defining a second path for delivering heating current to the electrical heater of the delivery air thermostat and including a resistor, whereby the heating current so delivered is of less volume than the current delivered through the first mentioned heater circuit, and a third relay having a deenergized closed contact interposed in the first mentioned heater circuit and adapted when opened to make effective the second path for delivering said reduced volume of heating current to said delivery air thermostat, an energizing circuit for said third relay connected into said air heater energizing circuit through a deenergized closed contact of said second relay, and a circuit including a connector leading from the air heater energizing circuit in advance of said second relay and an energized closed contact of the third relay.

14. The combination of a heating apparatus and a control system therefor as defined in claim 12, provided with means defining a second path for delivering heating current to the electrical heater of the delivery air thermostat and including a resistor, whereby the heating current so delivered is of less volume than the current delivered through the first mentioned heater circuit, and a third relay having a deenergized closed contact interposed in the first mentioned heater circuit and adapted when opened to make effective the second path for delivering said reduced volume of heating current to said delivery air thermostat, an energizing circuit for said third relay connected into said air heater energizing circuit through a deenergized closed contact of said second relay, a circuit including a connector leading from the air heater energizing circuit in advance of said second relay and an energized closed contact of the third relay, and a third circuit for the auxiliary heater of the delivery air thermostat including a deenergized closed contact of the relay controlled by said space thermostat, and adapted to deliver an additional large volume of heating current to the auxiliary heater of the delivery air thermostat when the space thermostat functions during a period when the said valve stands in its maximum heat delivery position.

15. The combination of a space heating apparatus and a control system therefor as defined in claim 12 in which manually operable means is provided for adjusting the functional setting of said delivery air thermostat.

16. The combination of a space heating apparatus and a control system therefor as defined in claim 12 in which the delivery air thermostat is provided with a plurality of contacts representing different temperature settings and in which manually operable means is provided to selectively connect any one of said contacts in the circuit for controlling the energization of said second relay.

TIMOTHY J. LEHANE.
EDWARD W. JOHNSON.

REFERENCES CITED

The following references are of record in the file of this patent:

UNITED STATES PATENTS

| Number | Name | Date |
|---|---|---|
| 2,009,823 | Van Vulpen | July 30, 1935 |
| 2,284,764 | Parks | June 2, 1942 |
| 2,382,073 | Lehane | Aug. 14, 1945 |
| 2,451,280 | Del Mar | Oct. 12, 1948 |
| 2,451,566 | Lehane | Oct. 19, 1948 |